(12) United States Patent
Hamama et al.

(10) Patent No.: US 7,769,536 B2
(45) Date of Patent: Aug. 3, 2010

(54) DIAGNOSTIC SYSTEMS AND METHODS FOR ENGINE KNOCK SENSORS

(75) Inventors: Wajdi B. Hamama, Whitmore Lake, MI (US); Craig M. Sawdon, Williamston, MI (US); Robert J. Horner, Dexter, MI (US); Eric Ferch, Northville, MI (US); Hamid M. Esfahan, Ann Arbor, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/391,479

(22) Filed: Feb. 24, 2009

(65) Prior Publication Data

US 2010/0168991 A1    Jul. 1, 2010

Related U.S. Application Data

(60) Provisional application No. 61/141,743, filed on Dec. 31, 2008.

(51) Int. Cl.
*F02P 5/15*   (2006.01)

(52) U.S. Cl. .................................. 701/111; 123/406.38
(58) Field of Classification Search ................. 701/111; 73/35.07, 114.02, 114.16; 123/435, 406.16, 123/406.21, 406.37, 406.39, 406.38
See application file for complete search history.

(56) References Cited

U.S. PATENT DOCUMENTS

| | | | |
|---|---|---|---|
| 6,456,927 B1 * | 9/2002 | Frankowski et al. | 701/111 |
| 6,789,409 B2 * | 9/2004 | Tanaya | 73/35.08 |
| 6,988,483 B1 * | 1/2006 | Hagari | 123/406.16 |
| 7,562,558 B2 * | 7/2009 | Horner et al. | 73/35.09 |
| 2009/0211337 A1 * | 8/2009 | Masuda et al. | 73/35.09 |

* cited by examiner

*Primary Examiner*—Hai H Huynh

(57) ABSTRACT

An engine control system includes a digital signal processing (DSP) module that generates a fast Fourier transform (FFT) of an engine knock signal generated by an engine knock sensor. An intensity determination module determines an engine knock intensity based on one of a maximum of and an average of the FFT. A status determination module determines a status of the engine knock sensor based on the engine knock intensity, a plurality of predetermined knock intensity thresholds, and a rotational speed of an engine crankshaft.

20 Claims, 4 Drawing Sheets

DIAGNOSTIC SYSTEMS AND METHODS FOR ENGINE KNOCK SENSORS

CROSS-REFERENCE TO RELATED APPLICATIONS

This application claims the benefit of U.S. Provisional Application No. 61/141,743, filed on Dec. 31, 2008. The disclosure of the above application is incorporated herein by reference.

FIELD

The present disclosure relates to engine sensor diagnostics, and more particularly to diagnostic systems and methods for engine knock sensors.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines draw air into an intake manifold through an air intake. The air is mixed with fuel to form an air-and-fuel (A/F) mixture. The A/F mixture is combusted within cylinders to drive pistons, which rotatably turn a crankshaft to produce drive torque.

The A/F mixture in a particular cylinder may combust at an undesired time. More specifically, temperature and/or pressure of the A/F mixture may exceed a critical level. Exceeding the critical temperature and/or pressure may cause the A/F mixture to ignite automatically prior to spark from a spark plug (i.e. a desired timing). The automatic ignition of the A/F mixture at the undesired time may be called "pre-ignition."

Engine pre-ignition may result in engine knock. For example, engine knock may be a vibration resulting from a rapid increase in cylinder pressure. Engine knock over a sustained period of time may result in, for example, damage to pistons, cylinder rings, and/or exhaust valves. Furthermore, engine knock may increase noise/vibration/harshness (NVH).

Engine control systems may include misfire detection systems and/or knock detection systems that determine if and when an engine knocks. Therefore, engine control systems may regulate engine operation to reduce or prevent engine knock. Preventing engine knock may improve engine performance and/or vehicle drivability.

SUMMARY

An engine control system includes a digital signal processing (DSP) module that generates a fast Fourier transform (FFT) of an engine knock signal generated by an engine knock sensor. An intensity determination module determines an engine knock intensity based on one of a maximum of and an average of the FFT. A status determination module determines a status of the engine knock sensor based on the engine knock intensity, a plurality of predetermined knock intensity thresholds, and a rotational speed of an engine crankshaft.

A method includes generating a fast Fourier transform (FFT) of an engine knock signal generated by an engine knock sensor, determining an engine knock intensity based on one of a maximum of and an average of the FFT, and determining a status of the engine knock sensor based on the engine knock intensity, a plurality of predetermined knock intensity thresholds, and a rotational speed of an engine crankshaft.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
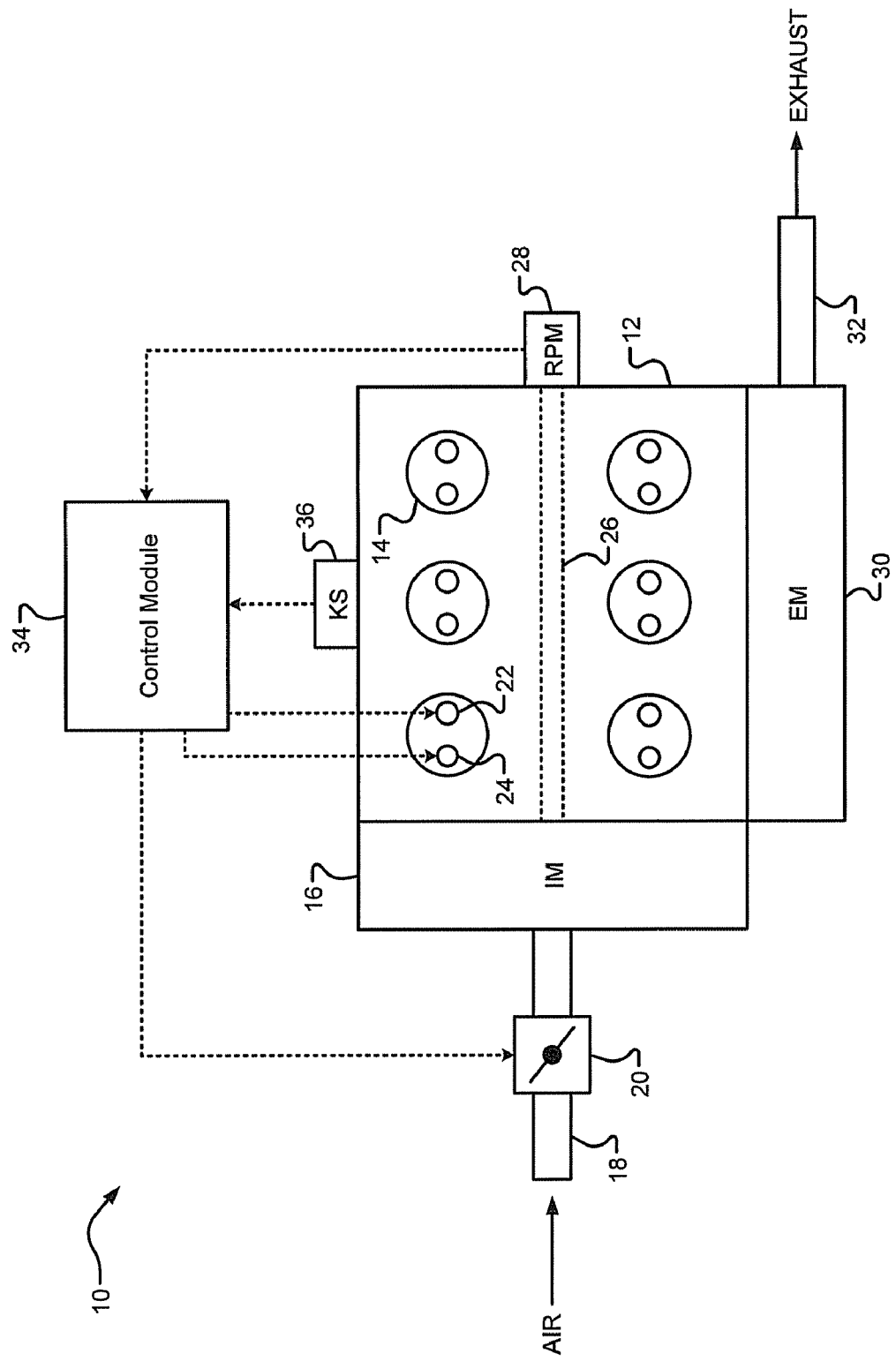
FIG. 1 is a functional block diagram of an engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typical knock detection systems may include a knock sensor and a knock detection circuit. Furthermore, dedicated knock detection systems that include a knock sensor and a knock detection circuit may be included in each cylinder of an engine.

The knock sensor may generate an analog voltage signal based on intensity of engine knock. For example, a higher voltage may relate to more intense engine knocking. The knock detection circuit may process the knock signal. For example, the knock detection circuit may process the knock signal to determine maximum engine knock intensity. For purposes of simplicity, a knock sensor and a knock detection circuit are hereinafter referred to collectively as a knock sensor.

An open line (i.e. open circuit) in a knock sensor may cause the knock sensor to fail. In other words, the open circuit may cause the knock sensor to generate incorrect engine knock measurements. Therefore, engine control systems may perform open circuit diagnostics on a knock sensor to determine whether the knock detection circuit has an open line (i.e. open circuit).

Typical engine control systems may perform analog processing of the knock signal to determine whether the knock sensor has an open circuit. For example, the engine control system may average the knock signal over various time windows and compare the average to a predetermined threshold. However, the typical open circuit diagnostic of a knock sensor may not be used for all engine operating conditions. In other words, typical engine control systems may not detect some open circuits due to slow signal processing and high engine crankshaft revolutions-per-minute (RPM) levels.

Referring now to FIG. 1, an engine system 10 that includes an engine 12 is shown. The engine 12 includes a plurality of cylinders 14. It may be appreciated that while 6 cylinders are shown, 3, 4, 5, 8, 10, 12, and 16 cylinder implementations may also be used.

Air is drawn into the engine 12 and into an intake manifold 16 through an air intake 18 that is regulated by a throttle 20. The air is distributed to the cylinders 14 and combined with fuel from a fuel tank (not shown). For example, the fuel may be injected into the cylinders 14 by a plurality of fuel injectors 22.

The air-and-fuel (A/F) mixture in the cylinders 14 is compressed by pistons (not shown) and combusted by a plurality of spark plugs 24. The combustion of the A/F mixture drives the pistons (not shown), which rotatably turn a crankshaft 26 to product drive torque. An engine speed sensor 28 measures a rotational speed (RPM) of the crankshaft 26. Exhaust gases may be expelled from the cylinders 14 through an exhaust manifold 30 and an exhaust system 32.

A control module 34 regulates operation of the engine 12. For example only, the control module 34 may control the throttle 20 and the fuel injectors 22 to control the A/F ratio in the engine 12. For example only, the control module 34 may control the spark plugs 24 to control the ignition timing of the engine 12.

A knock sensor 36 generates a knock signal based on vibration of the engine 12 resulting from combustion. For example only, the knock sensor 36 may include an accelerometer that generates an analog voltage signal. While one knock sensor 36 is shown, a plurality of knock sensors may also be implemented. For example, one knock sensor 36 may be implemented for each of the cylinders 14 to measure vibration of the individual cylinders 14, respectively.

The control module 34 receives the knock signal from the knock sensor 36 and the engine RPM from the engine speed sensor 28. The control module 34 may perform digital signal processing (DSP) of the knock signal to determine whether the knock sensor 36 has an open circuit. The control module 34 may then vary operation of the engine 12 based on the status of the knock sensor 36. For example, the control module 34 may actuate the fuel injectors 22 and the spark plugs 24 based on the status of the knock sensor 36.

Figure 2:
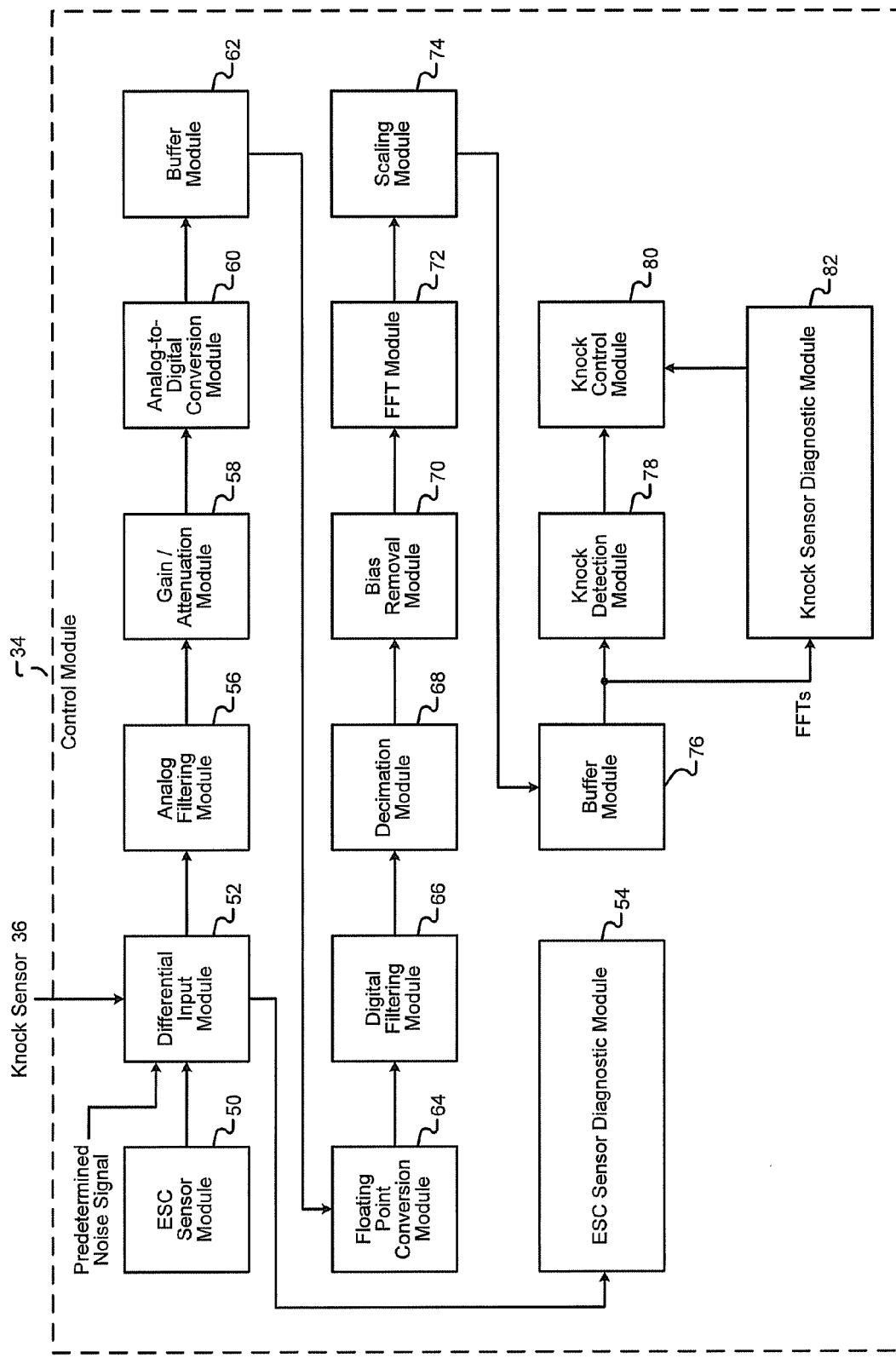
FIG. 2 is a functional block diagram of a control module according to the present disclosure.

Referring now to FIG. 2, the control module 34 is shown in more detail. The control module 34 receives the knock signal from the knock sensor 36. The control module 34 may also include an electronic stability control (ESC) sensor module 50. For example only, the ESC sensor module 50 may generate a noise/vibration/harshness (NVH) signal, similar to the knock signal.

A differential input module 52 receives the knock signal and the NVH signal. The differential input module may also add a predetermined noise signal to the knock signal and/or the NVH signal at low engine RPM levels. For example only, the differential input module 52 may add a 20 kHz noise signal when engine crankshaft speed is less than 3000 RPM. The addition of the predetermined noise signal at low engine RPM levels may improve accuracy of the diagnostics of the knock sensor 36 and/or the ESC sensor module 50.

The differential input module 52 may then output one of the knock signal and the NVH signal. For example, if diagnostics are to be performed on the ESC sensor module 50, the differential input module 52 may output the NVH signal to an ESC sensor diagnostic module 54. The ESC sensor diagnostic module 54 may then perform diagnostics of the ESC sensor module 50. Otherwise, the differential input module 52 may output the knock signal for knock control and/or knock sensor diagnostics.

An analog filtering module 56 receives the knock signal. The analog filtering module 56 performs analog filtering of the knock signal. For example only, the analog filtering module 56 may be a first order analog filter with a critical frequency ($F_c$) of 25 Hz.

A gain/attenuation module 58 receives the filtered knock signal. The gain/attenuation module 58 may apply a gain to the filtered knock signal. The gain/attenuation module 58 may also attenuate the filtered knock signal. For example only, applying a gain to or attenuating the knock signal may improve diagnostic accuracy of the knock sensor 36.

An analog-to-digital conversion module 60 receives the signal from the gain/attenuation module 58. The analog-to-digital conversion module 60 converts the received signal (i.e. an analog input signal) to a digital signal. For example, the analog-to-digital conversion module 60 may generate a digital signal with a minimum length. For example only, the minimum length may be 10 bits. A buffer module 62 receives the digital signal. The buffer module 62 buffers the digital signal prior to digital signal processing (DSP).

A floating point conversion module 64 receives the buffered digital signal. The floating point conversion module 64 converts the buffered digital signal to an array of floating point numbers. In other words, the floating point conversion module 64 generates a string of binary digits corresponding to the buffered digital signal.

A digital filtering module 66 receives the array of floating point numbers. The digital filtering module 66 performs digital filtering (i.e. DSP) of the array of floating point numbers. For example only, the digital filtering module 66 may include a fourth order elliptic infinite impulse response (IIR) filter with a critical frequency ($F_c$) of 20 Hz. For example only, the digital filtering module 66 may alternatively include two second order elliptic IIR filters in series. Implementing two IIR filters in series may improve system stability.

A decimation module 68 receives the filtered digital signal. The decimation module 68 reduces the number of samples in the filtered digital signal. For example, the decimation module 68 may perform low-pass anti-aliasing filtering and then perform downsampling. For example only, the decimation module 68 may downsample the filtered digital signal to 50 kHz.

A bias removal module 70 receives the decimated digital signal. The bias removal module 70 removes signal bias. For example, the bias removal module 70 may remove a direct current (DC) bias from the decimated digital signal. The signal generated by the bias removal module 70 may hereinafter be referred to as a processed knock signal.

An FFT module 72 receives the processed knock signal. The FFT module 72 generates one or more fast Fourier transforms (FFTs) of the processed knock signal. For example only, the FFT module 72 may generate 128 point or 256 point FFTs. The FFT module 72 may generate a plurality of FFTs corresponding to a plurality of engine RPM levels. The FFT module 72 may also generate an FFT for a frequency range corresponding to a maximum intensity. Furthermore, the FFT module 72 may generate more than one FFT based on the length of the processed knock signal (i.e. the knock window). In other words, a longer processed knock signal may require more than one FFT.

A scaling module 74 receives the one of more FFTs from the FFT module 72. The scaling module 74 scales the one or more FFTs. For example, the scaling module 74 may scale the one or more FFTs to improve accuracy of knock detection and control and/or diagnostics of the knock sensor 36. A buffer module 76 receives the one or more scaled FFTs. The buffer module 76 buffers the one or more scaled FFTs prior to knock detection and control and/or diagnostics of the knock sensor 36.

A knock detection module 78 receives the one or more buffered FFTs. The knock detection module 78 detects engine knock based on the one or more buffered FFTs. In other words, the knock detection module 78 may determine an engine knock level based on the one or more buffered FFTs. For example only, the knock detection module 78 may generate a knock control signal when the engine knock level exceeds a predetermined engine knock threshold.

A knock control module 80 receives the knock control signal and controls various engine parameters based on the engine knock signal. For example, the knock control module 80 may control fuel injectors 22 and/or spark plugs 24 based on the engine knock signal.

A knock sensor diagnostic module 82 also receives the one or more buffered FFTs. The knock sensor diagnostic module 82 determines a status of the knock sensor 36 based on the one or more buffered FFTs. First, the knock sensor diagnostic module 82 may determine an engine knock level based on the one or more buffered FFTs. For example only, the knock sensor diagnostic module 82 may determine that the knock sensor 36 has failed (i.e. an open circuit) when the engine knock level is between a predetermined low threshold and a predetermined high threshold.

If the knock sensor diagnostic module 82 determines that the knock sensor 36 has failed, the control module 34 may perform open-loop knock control. In other words, the control module 34 may control engine knock based on inputs other than the knock sensor 36. For example, the control module 34 may actuate fuel injectors 22 and/or spark plugs 24 based on predetermined settings and/or sensor inputs other than the knock sensor 36. For example only, the other sensor inputs may be oxygen sensors in the exhaust stream.

Figure 3:
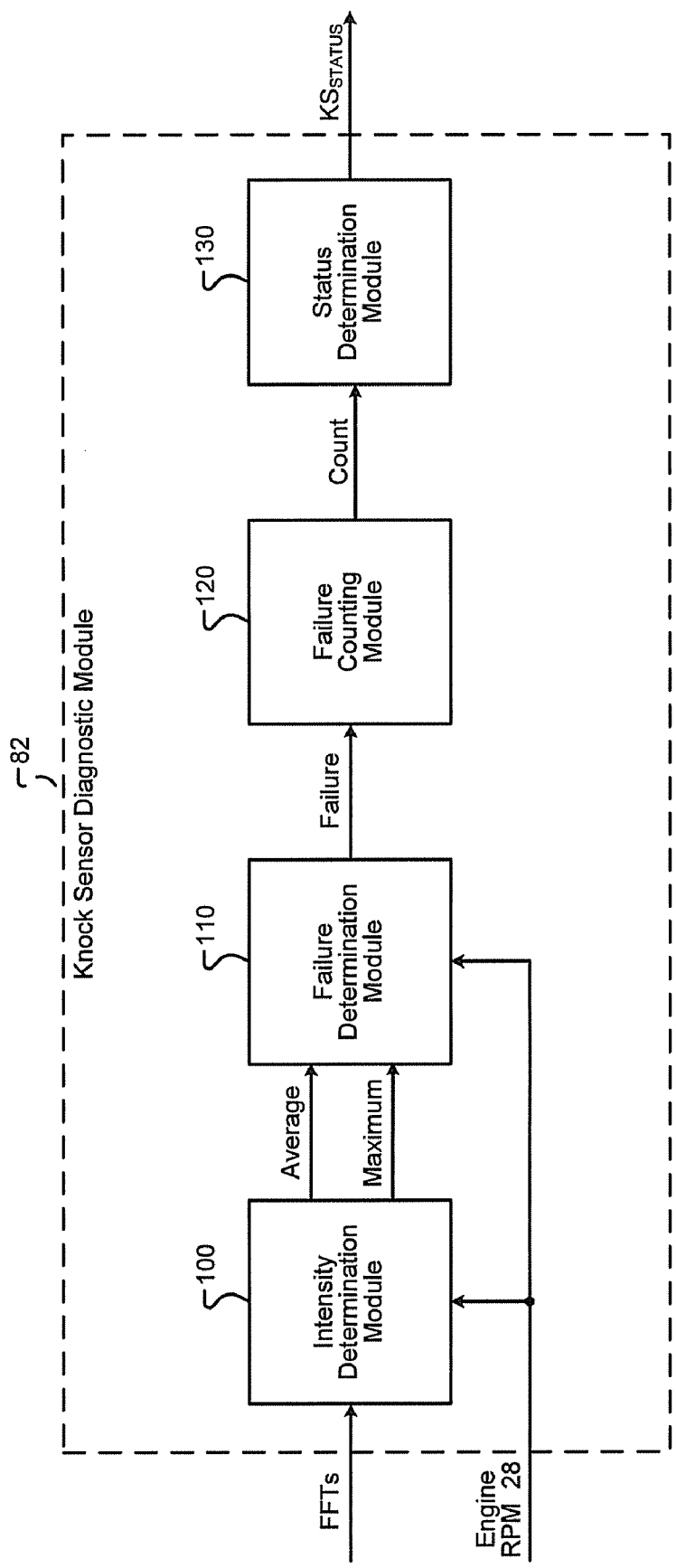
FIG. 3 is a functional block diagram of a knock sensor diagnostic module according to the present disclosure.

Referring now to FIG. 3, the knock sensor diagnostic module 82 is shown in more detail. The knock sensor diagnostic module 82 may include an intensity determination module 100, a failure determination module 110, a failure counting module 120, and a status determination module 130.

The intensity determination module 100 receives the one or more buffered FFTs. The one or more buffered FFTs each include a plurality of knock intensities corresponding to a plurality of frequencies. The intensity determination module 100 generates one of a maximum intensity and an average intensity. For example, the intensity determination module 100 may select a maximum intensity within a range of frequencies. Additionally, the intensity determination module 100 may average a plurality of intensities over a range of frequencies.

The failure determination module 110 receives the maximum intensity or the average intensity, hereinafter referred to as the knock intensity. The failure determination module 110 compares the knock intensity to predetermined knock intensity thresholds. For example, the predetermined knock intensity thresholds may each include a low intensity threshold and a high intensity threshold. For example only, the predetermined knock intensity thresholds may be stored in a lookup table. Additionally, the predetermined knock intensity thresholds may vary based on engine RPM. For example, the predetermined knock intensity thresholds may increase as engine RPM increases.

The failure determination module 110 determines whether the knock intensity is between a corresponding low intensity threshold and a corresponding high intensity threshold. If true, the failure determination module 110 outputs a failure signal. The failure determination module 110 may operate continuously and thus may output the failure signal more than once during a predetermined duration of time. For example only, the failure determination module 110 may output the failure signal during low-resolution compression events. In other words, the failure determination module 110 may output the failure signal after combustion when engine knock is minimal.

The failure counting module 120 receives the failure signal. For example only, the failure counting module 120 may further include an X/Y-type counter. The failure counting module 120 counts a number of failure signals received during the predetermined duration of time. For example only, the predetermined duration of time (i.e. a reporting interval) may be 100 ms. The number of failures during the reporting interval may be hereinafter referred to as a failure count. Thus, the failure counting module 120 determines the failure count during a reporting interval and outputs the failure count after the reporting interval.

The status determination module 130 receives the failure count and determines a status of the knock sensor 36. For example, when the failure count is greater than a predetermined failure count threshold, the status determination module 130 may determine that the knock sensor 36 has failed. Therefore, the status determination module 130 may generate a low (i.e. failure) status signal.

However, when the failure count is less than or equal to the predetermined failure count threshold, the status determination module 130 may determine that the knock sensor 36 is functioning properly. Therefore, the status determination module 130 may generate a high (i.e. OK) status signal.

Figure 4:
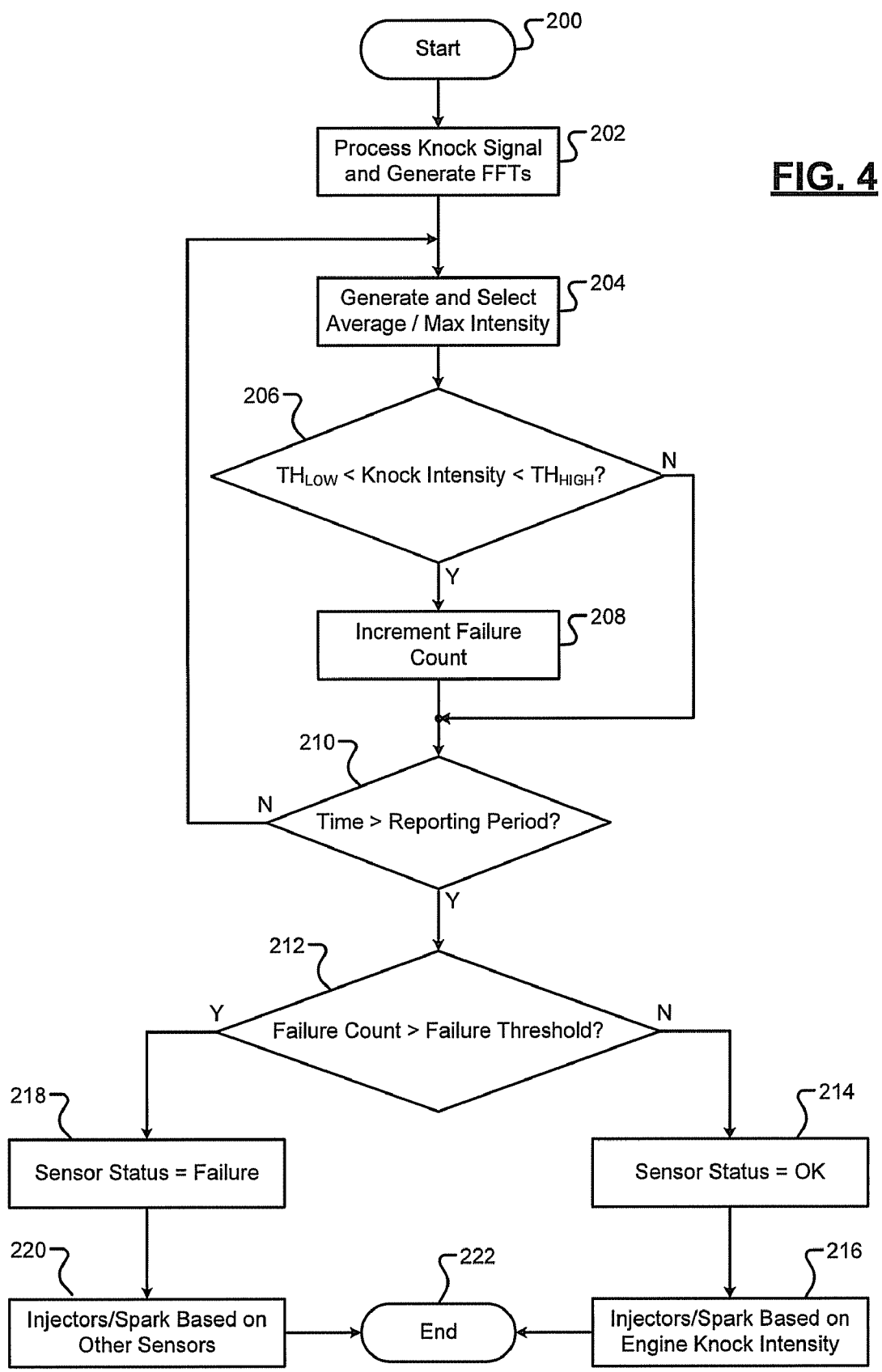
FIG. 4 a flow diagram of a method for determining a status of a knock sensor status according to the present disclosure.

Referring now to FIG. 4, a flow diagram representing a method of operation of the control module 34 begins in step 200. In step 202, the control module 34 performs digital signal processing (DSP) of the knock signal and generates one or more fast Fourier transforms (FFTs) based on the processed knock signal. In step 204, the control module 34 generates and selects one of a maximum engine knock intensity and an average engine knock intensity.

In step 206, the control module 34 compares the selected engine knock intensity to a low intensity threshold and a high intensity threshold corresponding to a predetermined knock intensity threshold. If the engine knock intensity is between the low intensity threshold and the high intensity threshold, control proceeds to step 208. If no, control proceeds to step 210.

In step 208, the control module 34 increments the failure count. In step 210, the control module 34 determines whether the reporting time interval has expired. For example only, the reporting time window may be 100 ms. If yes, control proceeds to step 212. If no, control returns to step 204.

In step 212, the control module 34 determines whether the failure count exceeds a predetermined failure count threshold. If no, control proceeds to step 214. If yes, control proceeds to step 218. In step 214, the control module 34 determines that the knock sensor 36 is functioning properly. In step 216, the control module 34 actuates fuel injectors 22 and/or spark plugs 24 based on the engine knock signal, and control ends in step 222.

In step 218, the control module 34 determines that the knock sensor 36 has failed (i.e. an open circuit). In step 220, the control module 34 actuates fuel injectors 22 and/or spark plugs 24 based on predetermined settings or sensor inputs other than the knock sensor 36. For example, the other sensor inputs may be oxygen sensors in the exhaust stream. Control then ends in step 222.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system comprising:
    a digital signal processing (DSP) module that generates a fast Fourier transform (FFT) of an engine knock signal generated by an engine knock sensor;
    an intensity determination module that determines an engine knock intensity based on one of a maximum of and an average of the FFT; and
    a status determination module that determines a status of the engine knock sensor based on the engine knock intensity, a plurality of predetermined knock intensity thresholds, and a rotational speed of an engine crankshaft.

2. The engine control system of claim 1, wherein the predetermined knock intensity thresholds are based on the rotational speed of the engine crankshaft.

3. The engine control system of claim 2, wherein the plurality of predetermined knock intensity thresholds includes a plurality of low intensity thresholds and a plurality of high intensity thresholds.

4. The engine control system of claim 3, wherein the status of the engine knock sensor is set to failure when the engine knock intensity is between one of the low intensity thresholds and one of the high intensity thresholds.

5. The engine control system of claim 4, wherein a failure count is incremented when the status of the engine knock sensor is set to failure during a predetermined time interval.

6. The engine control system of claim 5, wherein the failure count is output and reset to zero after the predetermined time interval.

7. The engine control system of claim 6, further comprising:
    a knock control module that actuates one or more of a plurality of fuel injectors and a plurality of spark plugs based on the engine knock signal when the failure count is less than or equal to a predetermined failure count threshold.

8. The engine control of claim 1, wherein the FFT includes a plurality of subsets corresponding to a plurality of frequency ranges.

9. The engine control system of claim 8, wherein each of the subsets includes a plurality of intensities corresponding to a plurality of frequencies.

10. The engine control system of claim 9, wherein the intensity determination module determines the engine knock intensity based on one of a maximum of and an average of intensities corresponding to one of the subsets.

11. A method comprising:
    generating a fast Fourier transform (FFT) of an engine knock signal generated by an engine knock sensor;
    determining an engine knock intensity based on one of a maximum of and an average of the FFT; and
    determining a status of the engine knock sensor based on the engine knock intensity, a plurality of predetermined knock intensity thresholds, and a rotational speed of an engine crankshaft.

12. The method of claim 11, wherein the predetermined knock intensity thresholds are based on the rotational speed of the engine crankshaft.

13. The method of claim 12, wherein the plurality of predetermined knock intensity thresholds includes a plurality of low intensity thresholds and a plurality of high intensity thresholds.

14. The method of claim 13, further comprising:
    setting the status of the engine knock sensor to failure when the engine knock intensity is between one of the low intensity thresholds and one of the high intensity thresholds.

15. The method of claim 14, further comprising:
    incrementing a failure count when the status of the engine knock sensor is set to failure during a predetermined time interval.

16. The method of claim 15, further comprising:
    outputting the failure count after the predetermined time interval; and
    resetting the failure count to zero after the predetermined time interval.

17. The method of claim 16, further comprising:
    actuating one or more of a plurality of fuel injectors and a plurality of spark plugs based on the engine knock signal when the failure count is less than or equal to a predetermined failure count threshold.

18. The method of claim 11, wherein the FFT includes a plurality of subsets corresponding to a plurality of frequency ranges.

19. The method of claim 18, wherein each of the subsets includes a plurality of intensities corresponding to a plurality of frequencies.

20. The method of claim 19, further comprising:
    determining the engine knock intensity based on one of a maximum of and an average of intensities corresponding to one of the subsets.

* * * * *